(12) United States Patent  (10) Patent No.: US 7,708,120 B2
Einbinder                          (45) Date of Patent:     May 4, 2010

(54) ELECTRONICALLY CONTROLLED BRAKES FOR WALKERS

(76) Inventor: Eli Einbinder, 111 E. 85th St., New York, NY (US) 10028-0958

( * ) Notice: Subject to any disclaimer, the term of this patent is extended or adjusted under 35 U.S.C. 154(b) by 297 days.

(21) Appl. No.: 11/889,932

(22) Filed: Aug. 17, 2007

(65) Prior Publication Data

US 2009/0045021 A1    Feb. 19, 2009

(51) Int. Cl.
*B60T 1/02* (2006.01)
(52) U.S. Cl. .......................... 188/31; 188/19; 188/2 A
(58) Field of Classification Search ................ 188/2 A, 188/2 F, 19, 20, 31, 71.9, 72.6, 72.7, 72.8, 188/156, 157, 158, 161, 162; 303/20; 135/65, 135/67
See application file for complete search history.

(56) References Cited

U.S. PATENT DOCUMENTS

| 4,384,713 A | 5/1983 | Deutsch et al. |
| 4,461,471 A | 7/1984 | Brastow |
| 5,636,651 A | 6/1997 | Einbinder |
| 5,730,255 A * | 3/1998 | Helmers ....................... 188/19 |
| 5,794,639 A | 8/1998 | Einbinder |
| 5,853,219 A | 12/1998 | Santuccio |
| 6,474,753 B1 * | 11/2002 | Rieth et al. ................... 303/20 |
| 7,144,025 B2 * | 12/2006 | Wakita et al. ............... 188/2 F |
| 7,233,312 B2 | 6/2007 | Stern |
| 2004/0011610 A1 * | 1/2004 | Witzler et al. ................. 303/20 |
| 2007/0051566 A1 * | 3/2007 | Marlow ....................... 188/20 |

* cited by examiner

*Primary Examiner*—Thomas J Williams
(74) *Attorney, Agent, or Firm*—Jones, Tullar & Cooper

(57) ABSTRACT

An improved electronic braking system for walkers that incorporates one or more electrically-operated brakes controlled by an electronic controller is disclosed. The controller is responsive to touch-sensitive switches for easy operation, and is adjustable and responsive to operator patterns of use to provide individualized control of the brake operation. The controller may also be responsive to environmental conditions such as the slope of the ground over which the walker is moving, to its rate of motion, or to the distance between the walker frame and the user, and may be adjusted to accommodate for the weight of the user or to set limits to the speed at which it can move.

16 Claims, 5 Drawing Sheets

ELECTRONICALLY CONTROLLED BRAKES FOR WALKERS

BACKGROUND OF THE INVENTION

The present invention relates, in general, to methods and apparatus for controlling the movement of supportive wheeled vehicles of the type that ordinarily would be pushed or pulled by an operator, and, more particularly, to the application of such methods and apparatus to walking aids for weak but ambulatory people, for apparatus for adjusting such walking aids to meet the particular and evolving needs of such people, and more particularly to an improved electronically controlled braking system for such walking aids.

A wide range of structures have been devised to assist people who find it difficult to walk unaided, and who may be lacking in strength or manual dexterity. A commonly-used structure for this purpose is customarily referred to as a walker, although various other structures such as wheel chairs, carts and the like are also available. The present invention will be described in conjunction with walkers, but it will be understood that the invention is not limited to a particular assistance structure. Conventionally, a walker is fabricated from tubing, has three or four vertical legs and has at least a horizontal support bar or a pair of spaced handles that can be grasped by the user, and is light-weight enough to enable the ambulatory person to move it between steps. Prior such structures require the user to manually grasp the walker, lift it, and move it forward a desired distance. The user then walks behind the structure to a position of greater stability near it, and repeats the process.

In addition to providing a stable support for moving about, walkers are especially useful for ambulatory people who may have dizzy spells, for then the walker serves as a stable structure with which the person using the device may support himself or herself when needed. If the user stumbles, a fall may be avoided by quickly grasping the walker, and for these reasons, the stability of a walker is of utmost importance.

Walkers, as executed in the prior art, have some problems, however. A lightweight walker can be easy to lift, but because of its lightness, it may not be stable, whereas a heavy walker will be stable, but difficult to lift. The operation of lifting and moving a conventional walker can make locomotion difficult, awkward, and unstable for people who are too weak to firmly grasp or to lift it, for during the time that the walker is being lifted and moved, the user is less stable even than would ordinarily be the case when standing alone and without external support. Thus, the act of lifting the walker can be a source of difficulty for the user.

To overcome this problem, walkers have been designed with wheels, some with motor-driven wheels, which allow the user to move the walker without having to lift it. However, wheels make the walker essentially unstable.

This problem has been recognized, and attempts have been made to lend stability by providing manually actuatable, cable-operated hand brakes for the wheels on walkers. Again, however, the use of hand brakes presents its own problems, since the operator may be afflicted with arthritis or some other debilitating injury or illness which prevents or makes difficult the laborious operation of the brakes and maintenance of the steady pressure required to operate them. These hand brakes are also not well suited for one needing a steadying support after a sudden stumble, since at such times, when the user quickly reaches for the walker, he or she is unlikely to be able readily to grasp the hand brake, which may be far in front of the user, and may instead simply push the walker further away. Further, squeezing a brake may be uncomfortable or difficult to coordinate with the users attempts to maintain stability.

Attempts to improve the stability of walkers with wheels include the use of various spring-loaded braking arrangements such as the so-called glide brakes which gradually, although inefficiently, brake the walker when weight or downward pressure is applied. In such devices, wheels may be mounted on telescoping legs that are spring-biased to move the wheels into contact with the ground to provide mobility for the walker. When the operator leans on the walker, the operator's weight overcomes the spring bias to telescope the wheel, allowing the walker leg to gradually contact the ground and provide a brake. Unfortunately, however, most of the "downward" force applied to a walker in motion is, in reality, a forward force. Therefore, such arrangements can be hazardous to the operator, since they do not respond to users' needs at different times, and may not be responsive to the characteristics and abilities of a particular user, with the result that the walker can roll away from the operator if insufficient pressure is being applied, or may stop prematurely upon application of a light pressure. Many walkers use a combination of wheels and ground-engaging legs; for example, two legs at the rear of the walker and two wheels at the front, to prevent accidental rolling, but such walkers can be awkward to use, since they require some lifting and rolling at the same time.

Motorized walkers with motor driven wheels have been provided, and some walkers have a predetermined operation when switched on so that they will move only a preselected distance. However, such devices may be heavy, and not only energy inefficient, but may be dangerous to disabled people. Further, they may essentially remove control of operation from the operator and may, if accidentally activated, present additional danger to the operator.

A still further problem with prior walking aids is their inability to provide for differing and changing needs. Individual's needs evolve as their conditions improve or deteriorate, but prior walkers have not been able to accommodate to such changes. As a result, a walker that is initially suitable for an individual may gradually become unsuitable over a period of time, and may not be usable by another person, such as a friend or family member.

Electric brakes for walkers are described in general in U.S. Pat. Nos. 5,636,651, issued on 10 Jun. 1997 and 5,794,639, issued on 18 Aug. 1998, both to the applicant herein, the disclosures of which are hereby incorporated herein by reference. As there described, a typical walker includes a frame having a handle or handles that may be grasped by the user, and three or four support legs. To provide mobility for the user, a wheel is affixed to the bottom of each leg, and in accordance with the patents, at least two of the wheels are provided with electrically operated brakes responsive to a switch placed on one of the handles for activation by the user. As described, the walker may incorporate active braking, wherein the brakes are normally released but may be activated by the operator when needed, or may incorporate passive braking, wherein the brakes are normally engaged but may be released by the operator when the walker is to be moved.

The electrically controlled brakes of the foregoing patents are an improvement over prior walkers with mechanically operated brakes, for as discussed above, mechanical brakes may be difficult to operate for those having reduced strength in their hands or who have slowed reflexes, and may be hard to grip for operators having arthritis in their hands. Further, mechanical brakes are not a realistic option for those having severe impairment of the hands, or who may be missing a hand. Additionally, the prior walkers, whether having mechanical or electrical brakes, can be unstable when the operator tries to move from a sitting to a standing position, and can be hard to push when used on uphill inclines and may roll away from the user when used on downhill inclines.

Thus, there is a need for an improved system for controlling the motion of wheeled walkers that can be operated by the feeble or infirm and which can be easily, reliably, and selectively made stable or mobile, which can be adjusted to meet evolving or different needs, which will be safe for the user, and which will be easy to use, so as to enhance the mobility of the user under any conditions.

SUMMARY OF THE INVENTION

The present invention is directed to an improved electronic braking system for mobility assisting devices such as walkers that incorporates one or more electrically-operated brakes controlled by an electronic controller that is responsive to one or more operator-actuated brake control switches for easy operation. The system of the invention is adjustable so that it can be preset to the needs of a particular operator, and/or may be adjusted in response to operator patterns of use, to provide individualized control of the brake operation. The controller may also be responsive to environmental conditions such as the slope of the ground over which the walker is moving or to the speed or acceleration of the walker, may be adjusted to accommodate for the weight of the user, may be adjusted to set limits to the speed at which it can move, and may permit adjustment of the response of the brakes to various conditions.

The braking system of the invention may be installed on any walker or similar device having wheels. In one of the illustrated embodiments the braking system is installed on a walker having a support frame which incorporates a pair of handles, or a support bar if desired, to be grasped by the user and carrying three wheels, while in another embodiment the walker has four wheels. In either embodiment, the walker has two rear wheels, between which the user walks while grasping the frame handles. In the three-wheeled version, the walker has a single front wheel, which may be a caster that is pivotable for steering, while in the four-wheeled version two pivotable front steering wheels may be provided. Both embodiments incorporate rear wheel brake assemblies that are operable by a common electric drive motor, such as a linear motor mounted on the support frame, preferably on a motor support platform secured above or between the front wheels. The brake controller includes an electronic control panel incorporating a microprocessor mounted in a suitable enclosure also mounted on the support platform, along with a battery power supply for the control panel and the brake motor. An optional master on/off switch may be provided for, and preferably mounted on, the controller along with a small signal lamp to indicate the status of the walker. An override switch may be provided to release the brakes when it is desired to move the walker, for example for storage or to position it for use, or to lock the brakes. The master and the override switches can be combined, if desired. A pair of brake control switches is mounted on the frame convenient to where the user places his or her hands during use of the device. In the illustrated embodiments, these switches are mounted on a pair of handles, but if a horizontal support bar is used in place of spaced handles, the switches would be positioned near where the bar is normally grasped. In addition, the handles or the support bar may incorporate hand sensors that detect the presence of the user's hands on the handles.

The hand sensors and the brake control switches are connected to the controller, which responds to activate the control system and to operate the brakes in accordance with a mode of operation that may be selected by or for the user. The controller responds to operation of the either of the brake control switches to regulate the power supplied to the brake motor. In one form of the invention, the controller provides a braking signal that is of an amplitude that is sufficient to slow the walker to a stop, and this amplitude is preset to meet the needs and desires of the user. In a preferred form of the invention, the controller may provide a pulsed braking signal of a preset or variable frequency, amplitude, and/or duration, to the brake actuator motor, to provide the amount of braking power needed by the user. The braking force applied to the wheels of the walker thus is controllable in accordance with a preset braking force that is variable to slow the walker when the user activates one or both of the braking switches. The braking force can be modified by or for the user in a variety of ways along a braking gradient to produce a selectable force to adjust the operation of the system. For example, by providing pressure sensitive brake control switches instead of simple on/off switches, the brake operation can be varied by the amount of pressure applied to the switches. Braking force can also be modified by input signals from, for example, tilt sensors that detect the angle of incline of the walker, by inputs from sensors that detect its rate of motion or its acceleration, or by inputs from distance sensors that detect the spacing between the user and the walker frame. The controller can also be adjusted to change the braking force for users of different weights, or in accordance with the user's wishes.

The brake control switches of the present invention can take a number of forms, accommodated to the needs and abilities of the user. Preferably, one switch is provided for each hand, and each switch can be activated by the operator to selectively engage or release the electrically operated brake mechanism. Each switch may be adjustable to be responsive to a predetermined operating condition that can be calibrated to match the operator's needs and adjusted as those needs change.

In one form of the invention, each brake control switch can be a sensor such as a capacitive switch responsive to a selectable, predetermined pressure applied by the operator to produce a signal that is received by a brake controller microprocessor that then produces a control signal to activate or to deactivate the brake. The amount and direction of pressure which is required to cause the actuator to activate the brake mechanism can be individually calibrated or preselected to meet the requirements of each user or can be adjusted to meet the changing needs of a single user. Since, as is well known in the art, touch-sensitive switches are capable of sensing forces of as little as one ounce or less, and can also sense very large forces, the walker of the present invention can be provided with a sensor that can meet the needs of a wide range of operators. Such an actuator can be calibrated to allow an ambulatory patient with, for example, severe arthritis, to operate the stabilizer mechanism on the walker with very little force. In order to accommodate a severely disabled or injured user, one or both of the walker handles may incorporate a receiver such as a glove, with the controller switch being incorporated in the receiver and responsive to pressure to produce brake controlling signals. Alternatively, the brake control switch may be an electrical strain gauge calibrated to respond to varying pressures to produce corresponding varying signals to the microprocessor, which, in turn, provides a varying output to control the braking force applied to the brakes.

If desired, the frame may incorporate a weight-sensitive brake control switch or switches, such as a strain gauge that can be mounted on the walker frame to detect downward and upward pressures applied to the frame by the operator. The switch responds to a predetermined downward pressure to apply the brakes and to a predetermined upward pressure to release the brakes. Accordingly, during active control of the braking system, the user can lean on the walker for support without activating the brakes, but by increasing the downward pressure beyond a preset threshold, the brakes are applied. The brakes may then remain engaged until the pressure is released and becomes less than the threshold. If the brakes are engaged as when the system is in a passive braking mode, the weight-sensitive switch may respond to a predetermined upward pressure applied to the frame to convert the system to an active mode and release them to allow movement. The pressure switches will be adjustable to respond to the amount of pressure required for operation and thus will be adjustable to accommodate operators of different weights.

By proper location and calibration of the brake control switches, the walker can be controlled by any operator. Further, the operator need not firmly grasp the walker, but needs only to touch it, or to touch it with a preselected pressure, to actuate the brake controller system. The actuator switches can be positioned on an upwardly facing surface of the walker handles for access by the user's thumbs, for example, or can be positioned on a downwardly facing surface, or both, or can be incorporated in a glove or other receiver secured to the walker, so that the actuator can respond to any selected type of motion, such as up, down, horizontal or twisting motions, when the operator's hands are positioned at any desired location to render the walker selectively mobile or stable when predetermined pressures are exerted.

The brakes utilized by the present invention can take a variety of forms, and thus may include elements which engage or disengage the ground, or may include elements which interact with or are a part of the wheels to provide an adjustable rolling resistance so that the effort required to roll the walker can be calibrated to the needs of the operator. In the preferred embodiments disclosed herein, lever-mounted, wheel-engaging brake pads are described, but it will be understood that the system of the invention can be used in combination with other suitable mechanical or electrical braking assemblies, and various mechanical, electrical or electromechanical actuator devices may be utilized to facilitate their operation and control. In the herein-disclosed preferred forms of the invention, for example, each brake assembly is a spring-biased brake lever arm carrying a brake pad that engages the periphery of at least one of the walker wheels. The braking mechanism preferably normally engages the wheel to provide passive braking and may be released by activation of the system to provide active braking control. Preferably, an electrically operated linear motor actuator that is responsive to the operator is connected to a controller to operate the brakes, with the controller providing a rapidly pulsing braking signal to repetitively engage and release them.

In accordance with the invention, the controller is programmable to operate the brakes in accordance with one of several selectable modes. First of all, the system may be provided with an override switch that allows an operator to override the control system and to place the walker in a "passive" mode, or state, wherein the brakes are locked, or an "active" mode, or state, wherein the brakes are unlocked. This allows an operator to immobilize the walker, if desired, and also allows the walker brakes to be released to facilitate its movement for storage or for positioning for use. In addition, a default mode switch may be provided to establish an initial passive or active setting of the control system at start-up.

A mode selector switch may be provided to select the control program for the system of the invention. Thus, for example, the system may incorporate a first, or basic mode of operation in which a brake control microprocessor responds to the brake control switches and to selected operational controls to engage or disengage the brakes. In this mode, if the default setting calls for an initial passive operation, the system operates to passively brake the walker when it is first turned on either by a master on/off switch or by touching one of the operator, or hand, detector sensors on the walker handles. The program preferably is set to release the brakes automatically a set time after the power has been turned on, for example 30 seconds, to thereby shift the program to an active mode, or state, where the brake control switches are used to engage or release the brakes under operator control. If desired, in this active state the microprocessor can be set keep the brake activated until one, or both if desired, of the control switches is operated by the user. Thereafter, in either case the walker is actively controlled by the user. If desired, the system can be set to change back to its passive, or braked, state or condition if the walker is not moved for a preset period of time, if both of the user's hands are removed from the handles, or if the controller is turned off.

A second mode of operation may include the foregoing features, with the addition of a hill detection function that may be activated to detect whether the walker is rolling away from the user. This mode may incorporate features such as a tilt sensor to determine whether the walker is moving uphill or downhill, a speed detector, an acceleration detector to sense changes in the speed of the walker, and a proximity detector to sense whether the walker is moving toward or away from the user. Such sensors will cooperate to prevent the user from losing control of the walker and having it roll back toward or roll away from him or her at a rate or at a distance that indicates a dangerous condition.

A third mode of operation may incorporate the features of the first two modes as described above, and additionally may incorporate a program in the microprocessor that will monitor the pattern of use of the brakes; i.e., the way the brakes are used when the user is moving on flat or inclined surfaces. The rate at which the brakes are applied, the amount of pressure, the length of pauses between successive movements of the walker, and the like, may have a detectable pattern that will enable the control system to anticipate a user's needs, as when going downhill, to facilitate the use of the walker. These three modes and other sequences of operation or desired braking features may provided by the described switches operating with the microprocessor to provide selected modifications of the braking signals produced by the microprocessor, as desired to meet the particular needs of a user.

BRIEF DESCRIPTION OF DRAWINGS

The foregoing, and additional objects, features and advantages of the present invention will become apparent to those of skill in the art from the following detailed description of preferred embodiments thereof, taken in conjunction with the accompanying drawings, in which.

DETAILED DESCRIPTION OF INVENTION

Walkers and other devices for assisting individuals who are infirm, or who have medical conditions that limit their mobility, have been available for many years, and have been of great help to large numbers of people. Such devices are commercially available in a variety of configurations to provide easily maneuverable walkers wheel chairs and the like. As discussed above, the present invention is described in conjunction with walkers, but may be adapted to other motion assisting devices, as well. As described in the afore-mentioned U.S. Pat. Nos. 5,636,651 and 5,794,639, walkers may be provided with both mechanical and electrically operated brakes to assist in controlling their movement. The present invention is directed to improvements in control systems for such devices.

Figure 1:
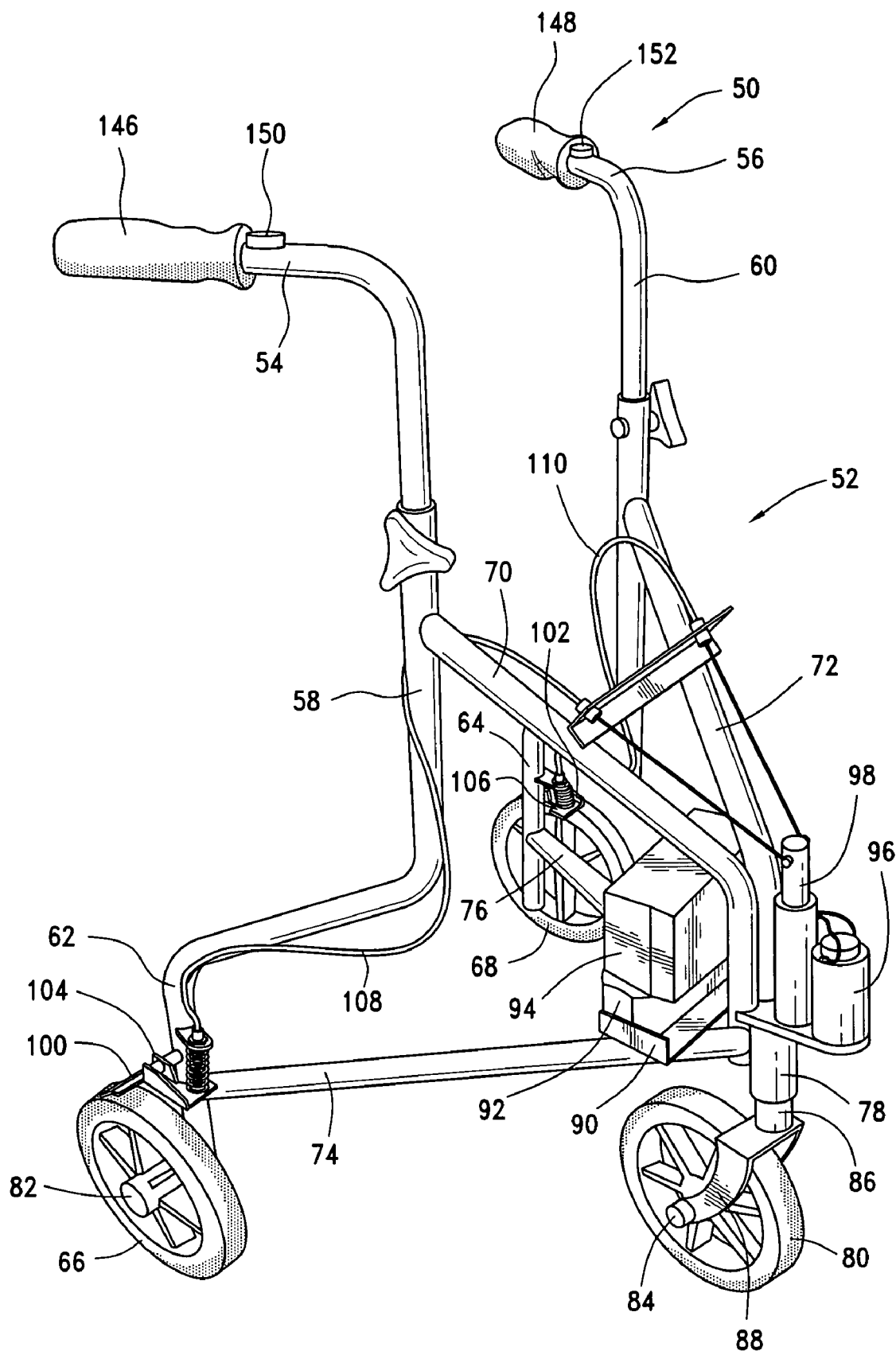
FIG. 1 is a diagrammatic illustration of a three-wheeled walker incorporating the electronic brake control system of the present invention.
Figure 3:
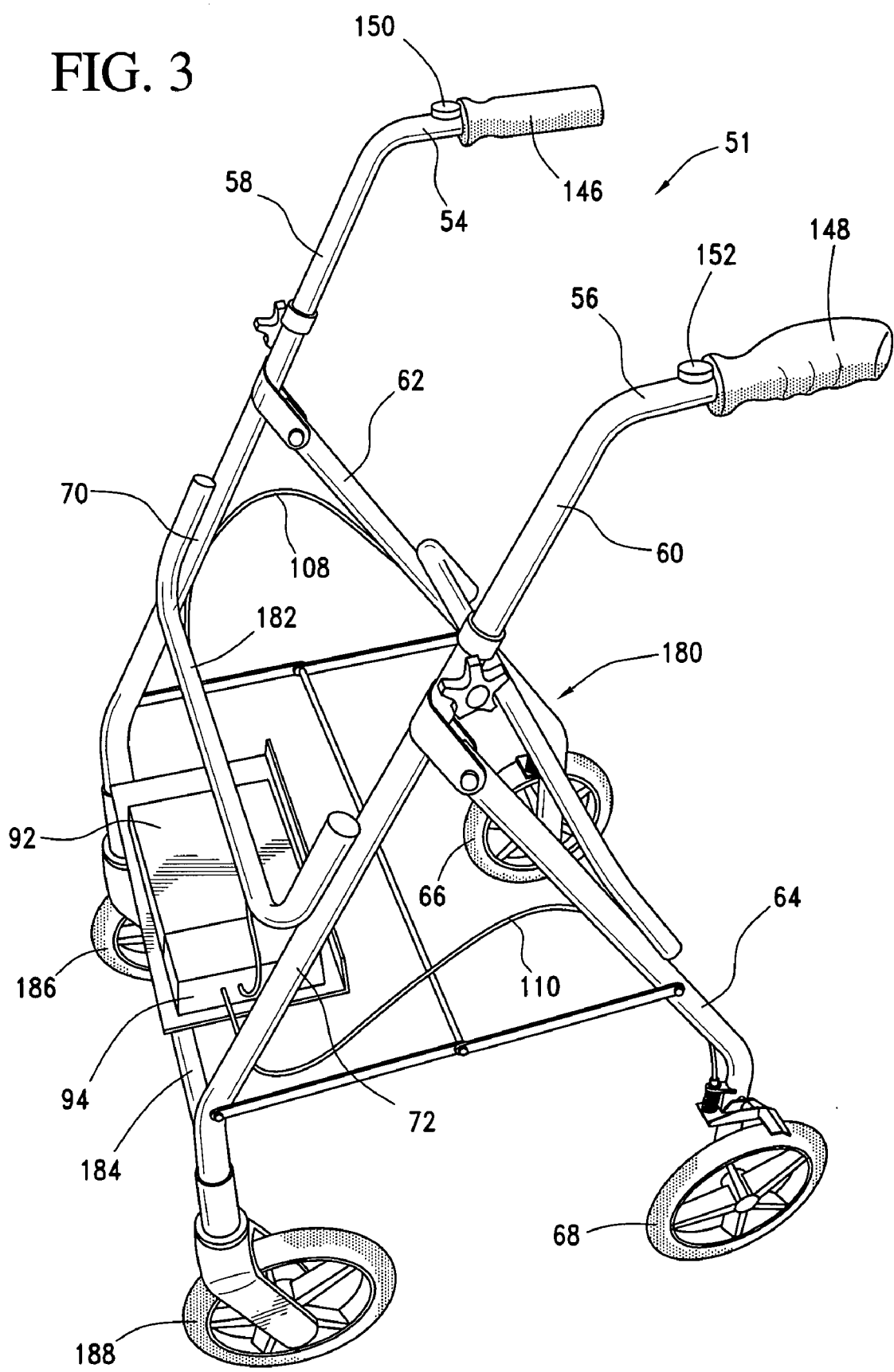
FIG. 3 is a diagrammatic illustration of a four-wheeled walker incorporating the electronic brake control system of the present invention.

The invention is illustrated in FIG. 1 in combination with a three-wheeled walker, as illustrated at 50, and in combination with a four-wheeled walker as illustrated at 51 in FIG. 3, wherein common elements are similarly numbered. In the illustration of FIG. 1, the walker is shown as having a frame portion 52 incorporating a pair of spaced handles 54 and 56 supported at the top of corresponding vertical frame members 58 and 60. As illustrated, pair of spaced rear legs 62 and 64 extend downwardly from the frame members 58 and 60, respectively, and carry respective rear wheels 66 and 68. An upper pair of forwardly extending frame members 70 and 72 and a lower pair of forwardly extending frame members 74 and 76 are connected to a forward vertical leg 78 which carries a front wheel 80 for the walker. In the preferred form of the invention, the rear wheels 66 and 68 are on fixed axles 82, while the front wheel 80 is a caster-type wheel having an axle 84 mounted on a pivotal shaft 86 by means of fork 88 to rotate around the vertical axis of the leg 78 to facilitate steering the walker. Three-wheeled walkers of this type are well known and commercially available, and although a particular structure is here illustrated, it will be understood that numerous variations may be made without departing from the present invention. Thus, for example, the walker frame may incorporate a horizontal cross bar in place of the spaced handles 54 and 56 for grasping by the operator.

Mounted on a platform 90 secured to the lower frame members 74 and 76 and to the forward leg 78 is a housing, or enclosure 92, that receives the electronic brake controller of the present invention, and a battery pack 94 to provide power to operate the brakes and the controller. A linear motor 96 is mounted securely on the front leg 78 and in one form of the invention is a solenoid that incorporates a movable armature, or drive shaft 98, for activating the brakes for the walker. In the illustrated embodiment, braking is accomplished by a pair of brake levers 100, 102 pivotally mounted to the rear legs 62 and 64, respectively, for motion toward and away from the surfaces of their respective wheels. The brake levers are mounted on brake supports 104, 106 fastened to the legs 62, 64, respectively, and may be spring-biased in a direction to cause brake pads on the outer ends of the brake levers to be released from the outer peripheries of their respective wheels to permit the walker to be moved.

The inner ends of the brake levers are connected by respective brake cables 108, 110, to the upper end of drive shaft 98 so that motion of the shaft is transferred to the brake pads. As illustrated, the brake cables are routed along the walker frame members for connection to the drive shaft 98. When the control system is set to its passive mode, initial activation of the control system, as by turning it on or by touching a hand sensor to indicate that an operator is present, energizes the linear motor 96 to draw the drive shaft 98 downwardly to pull the brake cables 108, 110, and to pivot the brake pads against the wheels to provide passive braking. The initial activation of the brakes when the system is turned on engages the brakes fully, and the motion of the actuator to accomplish this is used to calibrate the controller so that the actuator will move as far as is required to engage the brakes when the system is under active control. It will be understood that the brake pads may be installed on any or all of the wheels, but that the illustrated installation on the rear wheels is preferred.

A control system for the walker brakes described above is illustrated in diagrammatic form in FIG. 2, to which reference is now made. In this embodiment, the controller 92 incorporates a microprocessor 120, which may be an ATMega32 Microcontroller from Amtel Corporation, that receives a bias voltage from the battery 94 by way of an LM340T5 regulator 122 from National Semiconductor Corporation, which provides a 5-volt regulated voltage for the controller. The microprocessor, in response to the various inputs to be described, produces an output control signal on output line 124 to regulate the operation of a brake control circuit 126. This circuit, which may be an LMD18200T H-Bridge from National Semiconductor Corporation, in turn controls the supply of power from battery 94 to a linear motor brake actuator such as solenoid 132, which may be an Electrak E050 Linear actuator from McMaster Corporation, to drive the actuator and thereby operate the brakes. The brake controller responds to the output of the microprocessor to produce a pulsed output of variable frequency, duration, or amplitude so as to modulate the braking power applied to the wheels, and provides a feedback signal to the microprocessor by way of line 134 for initial calibration of the system and for enabling control by the microprocessor output signals. In the present invention, frequency modulation of the power applied to the brake actuator is preferred, so that the frequency of the power pulses applied to the brakes, and thus the braking power applied to the wheels, corresponds to, and is regulated by, the control signals from the microprocessor.

The microprocessor preferably is programmed to provide a number of selectable modes of operation so that it can respond to a variety of inputs to turn the system on or off and to regulate the amount of braking power applied to the wheels in response to those inputs. The user may select the inputs and the mode of operation to suit his or her needs; thus all or only some of the available control inputs may be activated, at the user's election. Although the selectable controls are shown separately in FIG. 2, it will be understood that some of them may be combined in multi-position switches for convenience.

Figure 2:
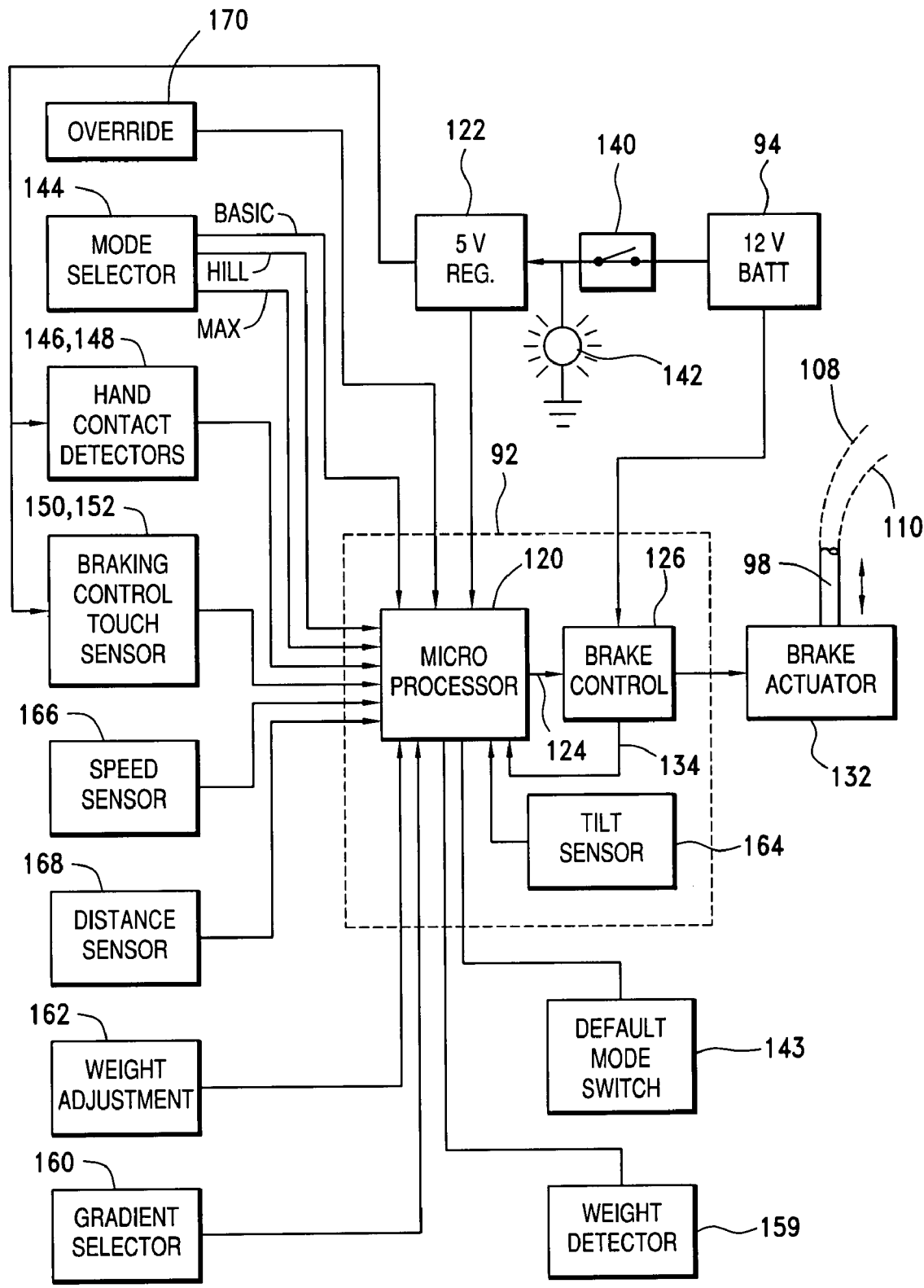
FIG. 2 is a circuit diagram of the brake control system according to the invention that is used in the walker of FIG. 1.

As illustrated in FIG. 2, a main on/off power switch 140 is provided to turn on the control system to initiate use of the walker or to turn the system off for storage. This switch is illustrated as being located between the battery 94 and the regulator 122, but may be located at the microprocessor if desired. A suitable indicator lamp, such as an LED 142, may be provided to indicate the status of the control system.

To allow the operator to select the initial function of the control circuit 92 when the system is first turned on, a default mode switch 143 is connected to the microprocessor 120 set the system in an active or a passive mode. Generally, the default will be the passive mode, so that upon initialization of the system, the brakes will be engaged, but in some circumstances it may be desirable to have the walker actively controlled as soon as it is turned on.

A mode selector switch 144 is connected to the microprocessor to allow the user to select between available modes of operation of the microprocessor, such as a basic control mode, a hill detector control mode, or a maximum stability control mode, to be described, wherein selected control features are activated. When the default switch is set to initialize the system in a passive mode, the basic control mode selects a program of operation wherein the microprocessor initially engages the brakes (passive operation) as soon as the power switch 140 is turned on, so that the walker is braked and is stabilized in the absence of commands from the operator. In one form of the invention, when the control system is turned on and the basic mode is selected, the microprocessor may be programmed to immediately apply the brakes, and then after a preset delay of, for example, 30 seconds, to release the brakes, converting the walker to its "active" mode of operation where the braking is under the control of the user. Alternatively, the passive mode is initially selected, and the active mode may be selected only when the operator takes some positive action to release the brakes.

To provide positive control of the change from the passive to the active mode of operation, the system may include a pair of hand contact sensors, 146 and 148, located on the handles 54 and 56, respectively, to detect the presence of the user's hands. These sensors are powered by the regulator 122, and are connected to the microprocessor 120, as illustrated. One or both of these sensors may be used to override the changeover from the passive mode to the active mode described above, to prevent shifting of the controller to the active mode and the consequent release of the brakes until one, or preferably both, hands of the user are grasping the walker handles, or are inserted into suitable gloves or other receptacles. When both hands are required to shift to the active mode, the microprocessor may be programmed to allow the user to release one of the handles, once the system shifts to the active mode, without changing the mode of operation, but if both hands are removed from the handle, the program reverts to the passive mode and locks the brakes.

Mounted on each handle is a corresponding touch-sensitive brake control switch, illustrated in FIG. 1 at 150 and 152 on handles 54 and 56, respectively. As illustrated in FIG. 2, these switches are connected to the battery through regulator 122 and to the microprocessor 120 to provide active braking control. These switches, in one form of the invention, are highly touch-sensitive capacitive switches, such as QT113-DG touch sensors from Quantum Research Group, that enable users who are weakened or infirm, or who have limited motion due to arthritis or injury, to operate the control system them with minimal effort or discomfort. Each switch produces a control signal for the microprocessor 120 that causes it to produce a corresponding output brake control signal on line 124 to operate the brake actuator solenoid 132; either switch may be used for braking control. The switches may simply be touch sensitive to apply the brakes, or in another embodiment may be pressure sensitive to control the amount of braking power to be applied to the walker's wheels in accordance with the pressure applied. Although touch-sensitive switches are preferred, it will be understood that other switch arrangements may be utilized to meet the needs of the user. For example, a rotary switch sensitive to twisting of the user's hand or wrist, or a pressure switch sensitive to a squeezing motion could be provided. In another embodiment of the invention, the brake control switches may be in the form of a weight detector 159 that is sensitive to downward and upward pressures so that the brakes can be applied simply by leaning on the handles, and released by lifting up. These switches may be strain sensors adjustable to respond to pressures above selected thresholds to meet the needs of a particular user.

As indicated in FIG. 2, a gradient selector 160 may be connected to the microprocessor 120 to allow the user to adjust the braking force that is applied to the wheels in response to the operation of the brake control touch switch by the user. This selector may be in the form of a potentiometer that adjusts the magnitude of the signal supplied to the microprocessor by the brake control switch, and serves to adjust the sensitivity of the control switch to meet the needs of the user. This adjustment is particularly useful in combination with pressure-sensors.

The foregoing controls may be considered as part of the basic mode of operation of the system and available when the selector switch 144 is set to the basic control mode. To further accommodate the braking system of the invention to the needs of an individual user, the system may optionally be provided with additional control features, which may be identified as part of a hill control mode, wherein the operation of the brakes in accordance with the described basic mode may be modified by additional features. In this mode, in addition to the features already described, a weight adjustment selector 162 may be connected to the microprocessor 120 to provide a modification of the braking force applied to the wheels in accordance with the weight of the user or the force the user applies to the handles when walking. Some users may require assistance mainly for balance, in which case they will not lean heavily on the walker, and will require less braking force to control the motion of the walker. Others may lean heavily on the handles or push the walker with a lot of weight, in which case a greater degree of braking force is needed. Accordingly, the weight adjustment selector 162 may be used to regulate the magnitude or frequency of the output signal on line 124 in response to a given braking signal produced by the touch switches 150, 152. This selector may also be used to manually adjust the braking force when the walker is to be used in a hilly area or on an incline.

Automatic adjustment of the braking force may be provided by a tilt sensor 164 located on the frame or in the control housing 92. This sensor is connected to the microprocessor 120 to compensate for any slope or incline in the surface on which the walker is being used, and responds to increases or decreases in the inclination of the surface to increase or decrease the braking force applied to the wheels when the user contacts one of the touch-sensitive control switches 150, 152 with a given force. Such a sensor is particularly useful in combination with touch-sensitive brake control switches of the on/off type that do not allow the user to modulate the braking pressure applied to the wheels by manipulation of the control switches.

If desired, the hill detector control mode of switch 144 may utilize a speed-responsive sensor 166, such as a tachometer on one of the non-braked wheels, which may be connected to the microprocessor 120 to provide a speed signal that will be used when the braking control switch is activated to adjust the braking power applied to the wheels in response to the rate of motion of the walker. Thus, the faster the walker is moving, the harder the brakes will be applied. If desired, the output from the speed sensor 166 may be used by the microprocessor to provide a drag on the braked wheels to slow the walker and to limit the maximum speed at which the walker will be permitted to move. The microprocessor will respond to the input from the speed sensor to apply the brakes in proportion to the measured rate of motion, to prevent the user from going too fast or to prevent the walker from running away with the user, and thus to provide an important safety mechanism. An additional-safety feature may be provided through the use of a distance sensor 168 that may be mounted on the walker frame 52 to measure the distance between the frame and the body of the user, and to apply the brakes if the distance increases beyond a preset distance. This prevents the walker from getting away from the user, and is of particular value for a disabled user who has difficulty in maintaining a steady pace, and reduces the need for the operator to be continually manipulating the brake control switches.

A third mode of operation selectable by mode selector switch 144 may be referred to as a maximum stability control mode which may incorporate all of the features described above for both the basic and the hill detection control modes, and additionally includes a microprocessor program for detecting the pattern of use of the brakes by a particular user. In this mode, for example, the microprocessor may track the frequency of operation of the brakes when going down an incline, and patterns the operation of the brakes to anticipate this usage so as to automatically maintain the user's preferred speed. Other patterns of use, such as speed of operation, length of pauses between movements of the walker and the like, may be monitored and used to provide a proactive control of the walker for a particular user. If desired, an override switch 170 may be provided on the frame to release the brakes to allow free movement of the walker.

Although the invention has been described above in terms of a three-wheeled walker with lever-type brakes on the rear wheels, it will be apparent to those of skill in the art that the described control system can be used on other types of walkers, such as the four-wheeled walker 51 illustrated in FIG. 3, wherein features common to those of FIGS. 1 and 2 are similarly numbered. As illustrated, this walker includes a frame 180 incorporating upright frame members 58 and 60 having handles 54 and 56, and rear frame members 62 and 64 carrying rear wheels 66 and 68 having brakes as described with respect to FIG. 1. In this embodiment, the forward frame members 70 and 72 are joined by horizontal frame members 182 and 184, and carry at their lower ends a pair of forward caster wheels 186 and 188. The control system housing 92 and the battery pack 94 are supported on the horizontal frame member 184, with the linear brake motor being mounted in the housing 92 in this embodiment. The linear motor is connected to the rear brakes by way of cables 108 and 110, as described above.

Figure 4:
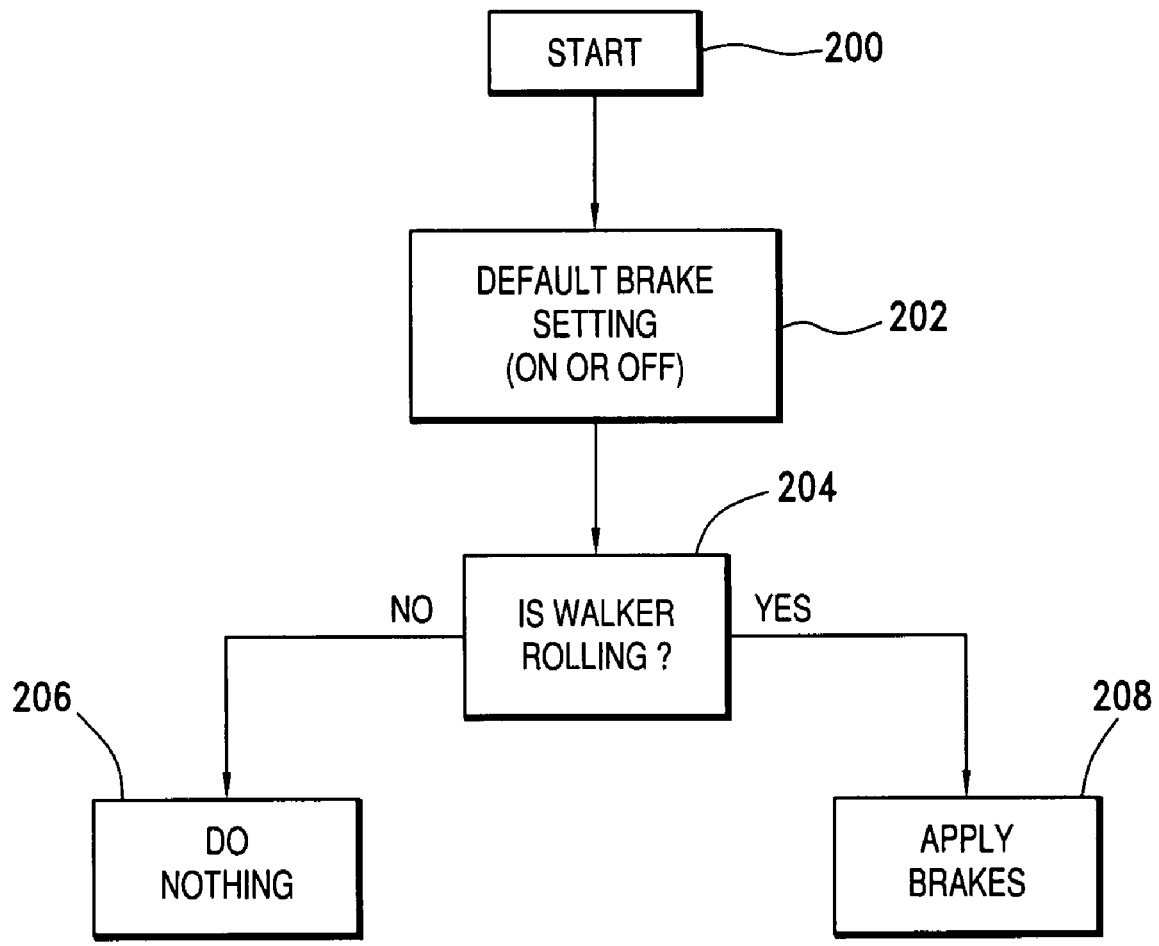
FIG. 4 is an example of an operational flow chart showing the operation of the control system with a default switch set for passive braking.

Examples of the sequences of operation of the various controls described above are illustrated in FIGS. 4 and 5, which are diagrammatic flow charts of the manner in which the microprocessor responds to various input signals. In the chart of FIG. 4, a rollaway detection procedure is illustrated, wherein after the control system is initiated, as illustrated at block 200, the microprocessor checks the position of default switch 143, as indicated at block 202. If the default is the passive mode, the brakes should be engaged, so the microprocessor checks the output of the speed sensor 166, as indicated at block 204. If there is no output, the walker is not rolling, so no action is required (block 206); if there is an output from the speed sensor, then the brake controller 126 is activated (block 208).

Figure 5:
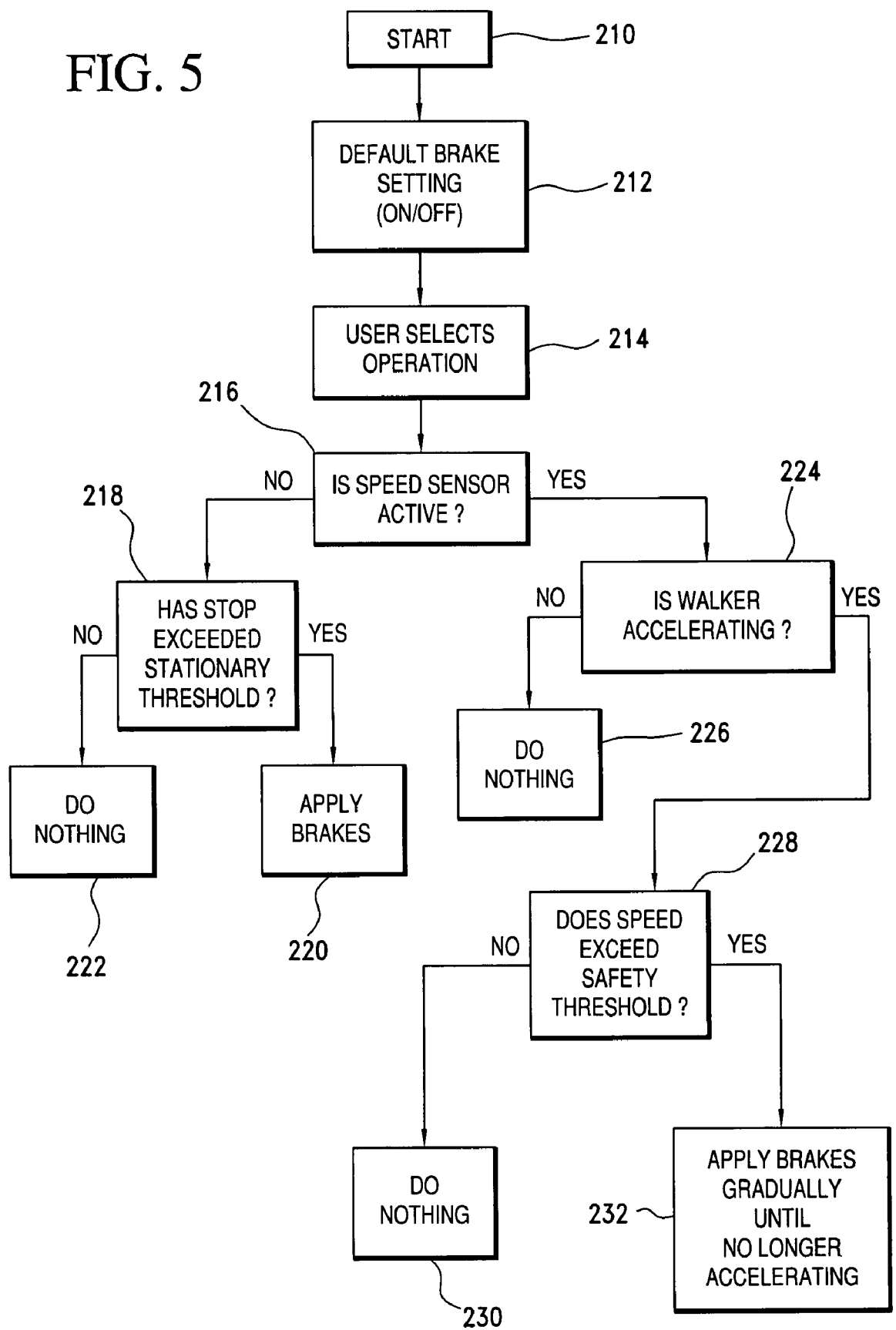
FIG. 5 is an example of an operational flow chart showing the operation of the control system with a default switch set for active braking and a mode control setting for basic active control.

A process for automatically regulating the motion of the walker to protect the operator is illustrated in FIG. 5. When the system is turned on (block 210), the microprocessor checks the default brake setting (block 212), and then checks to see if there has been an operator input that has shifted the system to an active mode (block 214). If the system is in the active mode, the microprocessor checks the speed sensor 166, as indicated at block 216, and if there is no signal being received, it determines how long the walker has been stationary (block 218). If the microprocessor has been set to shift the system back to the passive mode after a preset, or threshold, period of inaction, when that period elapses, the brakes are engaged (block 220). The system may then be restored to active control by operator action. If the threshold has not been exceeded, nothing is done (block 222).

If in the process of FIG. 5, the speed sensor is active (block 216), the microprocessor checks for changes in the output of the speed sensor, indicating acceleration Block 224), and if it is not accelerating, nothing is done (block 226). If it is accelerating, the microprocessor checks to see whether it is exceeding preset acceleration limits (block 228). If not, nothing is done (block 230); if the acceleration threshold is exceeded, indicating a possibly dangerous situation, the controller 126 is activated (block 232) to gradually apply the brakes until acceleration is reduced to the acceptable level.

Various other operational programs may be provided for the walker to adapt its functions to the needs of a particular user, or operator. For example, the control system may be set up to be switched on when a user approaches it, but with the system in its passive state with the brakes engaged, or it may be set up to remain off until the user grasps one or both of the handles (or the grasping bar). When the operator activates the brake control sensor, the control system shifts to its active state, wherein the engagement and disengagement of the brakes is under the control of the operator. In this active state the operation may be subject to automatic control of the brakes under predetermined conditions, as when a threshold speed is exceeded, when a slope is detected, and the like, as described above. The device may be shifted back to its passive state under a number of conditions that are programmed into the microprocessor. Thus, if the control system determines that no operator is present, as when the user has moved away from the device or if the device starts to coast away from the user, it will shift to the passive state and engage the brakes. If desired, the microprocessor can be programmed to shift the device to the passive state if it determines, as from the output of a speed sensor, that the device has not been moved for a preset period of time. Additionally, it can be programmed to respond to a preset pattern of operation of the brake control sensor, for example three quick presses, or the operator holding the brake control button for a long time, to shift to the passive state. Other patterns of operation will be apparent to those of skill in the art.

The above-described controls and switches cooperate with the microprocessor to control the brakes to provide a convenient and safe walker that can be easily adjusted to meet the varying needs of a single user or of multiple users. Although only rear brakes are illustrated in the preferred forms of the invention, it will be understood that brakes can be placed on any one or all of the walker wheels, and that although the illustrated brakes are lever-type brakes driven by a reversible linear motor, other types of brakes, such as disc brakes, may be used. Furthermore, it will be understood that although a single solenoid-type linear brake motor is illustrated, with cable actuators leading to the brake assemblies, it may in some cases be desirable to provide an individual electric drive motor for a brake assembly on each wheel, thus eliminating the need for brake cables. It will also be understood that although the brake control switches are described as touch sensitive switches, it may be desirable in some situations to provide slide switches that are position sensitive rather than pressure sensitive. Further, it may be desirable in some cases to utilize some of the above described sensors for additional control features; for example, the tilt switch described above may be used to activate a small drive motor on one of the wheels to provide an assist to the operator when the tilt detector senses that the walker is traveling uphill. Thus, modifications may be made to the present system as needed to meet the desires and requirements of the user, and the true spirit and scope of the invention is limited only by the following claims.

What is claimed is:

1. In a mobility assisting device having a support frame carried by at least one wheel:
    a brake assembly incorporating a brake actuator for said at least one wheel;
    a control system for said brake actuator, said control system incorporating a microprocessor and a brake controller circuit and being normally in an inactive state to hold said brake assembly in an engaged condition and being shiftable to an active state to shift the brake assembly between said engaged and a released condition, the engaged condition preventing said at least one wheel from rolling and the released condition allowing said at least one wheel to roll;
    said brake controller circuit being responsive to brake control output signals from said control system microprocessor for shifting said brake assembly between its engaged and released conditions;
    at least one operator-engageable support handle on said support frame;
    an operator detector on said support frame handle for producing operator detector signals when an operator grasps said support frame handle to allow activation of said control system and to deactivate the control system when the operator releases said support frame handle;
    at least one brake controller sensor located on said support frame handle for easy access by an operator grasping said handle and being responsive to operator actuation for producing brake controller sensor signals;
    said microprocessor being responsive to the presence of both said brake controller sensor signals and said operator detector signals to provide corresponding brake control outputs to enable an operator to controllably release or engage the brake assembly actuator by actuation of said brake controller sensor, the microprocessor being further responsive to the operator releasing said handle to shift said control system to the inactive state to thereby engage the brake assembly; and
    said brake controller circuit being connected to release or engage said brake actuator in response to said brake control output from said microprocessor.

2. The device of claim 1, said control system further including a default selector for placing said control system in its normally inactive state wherein said brake assembly is normally engaged, or for placing said control system in a normally active state wherein said brake assembly actuator is normally released and can be engaged and released under the control of an operator.

3. The device of claim 1, wherein said microprocessor is programmable to return the control system to its inactive state by a preset pattern of operation of said brake control sensor by an operator.

4. The device of claim 1, wherein said microprocessor is programmable to return the control system to its inactive state after a preset time of non-movement of the device.

5. The device of claim 1, wherein said support frame incorporates two support frame handles and wherein each handle includes an operator detector responsive to an operator grasping the handle and a brake controller sensor responsive to operator actuation for producing brake controller sensor signals, said operator detectors and said brake controller sensors being connected to said microprocessor to enable the operator to initiate, deactivate or alter operation of said control system as desired.

6. The device of claim 1, further including a speed sensor for detecting acceleration of said device, said microprocessor being responsive to said speed sensor to modify the operation of said brake controller.

7. The device of claim 1, further including a tilt sensor for detecting a change in the orientation of the device to produce a tilt signal, said microprocessor being responsive to said tilt signal to modify the operation of said brake controller.

8. The device of claim 1, further including a distance sensor for detecting the spacing between said device frame and a user operating the device to produce a distance signal, said microprocessor being responsive to said distance signal to modify the operation of said brake controller.

9. The device of claim 1, further including a weight adjuster to modify the operation of said brake controller in accordance with the weight of the device operator.

10. The device of claim 1, further including a gradient selector connected to said microprocessor to modify the response of said brake controller to pressure applied to said brake control sensor.

11. The device of claim 1, further including a weight sensor responsive to downward or upward pressure on said device by an operator, said microprocessor being responsive to applied weight to engage or release said brake assembly.

12. The device of claim 11, wherein said weight sensor responds to a preselected downward pressure on said device to produce an output signal to cause said brake controller to engage said brake assembly.

13. The device of claim 12, wherein said weight sensor responds to a preselected upward pressure on said device to produce an output signal to cause said brake controller to release said brake assembly.

14. The device of claim 1, wherein said brake actuator is a linear motor connected to said brake assembly, and wherein said brake control signals are variable in amplitude or frequency to activate said brake assembly.

15. The device of claim 1, further including:
    a drive motor for at least one wheel on said support frame; and
    a tilt sensor for detecting a change in the orientation of the device to produce a tilt signal, said microprocessor being responsive to said tilt signal to detect an uphill slope and to activate said drive motor.

16. The device of claim 1, further including an override switch for releasing said brake assembly when the device is powered on.

* * * * *